United States Patent
Langsdorf et al.

(10) Patent No.: US 6,907,755 B2
(45) Date of Patent: Jun. 21, 2005

(54) DEVICE FOR MANUFACTURING GLASS GOBS

(75) Inventors: Andreas Langsdorf, Ingelheim (DE); Christian Kunert, Mainz (DE)

(73) Assignee: Schott Glas (DE)

( * ) Notice: Subject to any disclaimer, the term of this patent is extended or adjusted under 35 U.S.C. 154(b) by 386 days.

(21) Appl. No.: 10/023,135

(22) Filed: Dec. 17, 2001

(65) Prior Publication Data

US 2002/0092326 A1 Jul. 18, 2002

(30) Foreign Application Priority Data

Dec. 16, 2000 (DE) .......................... 100 62 954

(51) Int. Cl.⁷ .............................. C03B 40/04
(52) U.S. Cl. ...................... 65/182.2; 65/304
(58) Field of Search ................. 65/25.1, 182.1, 65/182.2, 304, 305; 226/97, 97.3; 406/88, 89, 91

(56) References Cited

U.S. PATENT DOCUMENTS

| | | | | |
|---|---|---|---|---|
| 3,254,981 A | * | 6/1966 | Havens .......................... 65/359 |
| 3,731,823 A | * | 5/1973 | Goth ............................. 406/88 |
| 3,908,735 A | * | 9/1975 | Di Candia ..................... 164/475 |
| 3,961,927 A | * | 6/1976 | Alderson et al. ............. 65/25.1 |
| 3,979,196 A | * | 9/1976 | Frank et al. .................. 65/25.1 |
| 4,546,811 A | * | 10/1985 | Potard ......................... 164/66.1 |
| 4,615,724 A | * | 10/1986 | Fackelman .................. 65/182.2 |
| 4,688,784 A | * | 8/1987 | Wirz ............................ 271/195 |
| 4,866,857 A | * | 9/1989 | Clasen ......................... 34/362 |
| 5,336,288 A | * | 8/1994 | Carlomagno et al. ...... 65/182.2 |
| 5,762,673 A | * | 6/1998 | Hirota et al. ................ 65/25.1 |
| 5,873,921 A | * | 2/1999 | Hirota et al. ................ 65/25.1 |
| 2003/0051508 A1 | * | 3/2003 | Uezaki et al. ................. 65/66 |

FOREIGN PATENT DOCUMENTS

| | | | | |
|---|---|---|---|---|
| DE | 2410923 A | 3/1974 | | |
| FR | 588476 | 5/1925 | | |
| JP | 60235739 A | * 11/1985 | ........... C03B/40/04 |
| JP | 63236718 A | * 10/1988 | ............ C03B/7/16 |
| JP | 63256541 A | 10/1988 | | |
| JP | H10139465 | 5/1998 | | |

* cited by examiner

Primary Examiner—Steven P. Griffin
Assistant Examiner—Carlos Lopez
(74) Attorney, Agent, or Firm—Ostrolenk, Faber, Gerb & Soffen, LLP

(57) ABSTRACT

A device for manufacturing glass gobs includes a membrane body of a porous gas transmitting material. Channels for introducing compressed gas into the membrane body extend through the membrane body material and are spaced at a distance from the gas outlet surface of the membrane body. The channels run parallel to or are at an acute angle to the outlet surface. In an alternate embodiment, the channels are open channels at the opposite surface from the outlet surface.

16 Claims, 2 Drawing Sheets

DEVICE FOR MANUFACTURING GLASS GOBS

BACKGROUND OF THE INVENTION

The present invention relates to a device for manufacturing so-called gobs from glass. Such gobs serve as intermediate products for optical articles, such as lenses.

U.S. Pat. No. 5,762,673 describes a device, in which glass balls defined by dropping are produced from a molten mass of glass. The glass balls are kept in suspension in a gas stream while at the same time being brought to a specific temperature and a specific viscosity. In a further procedural step the glass gobs are subjected to a pressing procedure, followed by further processing steps.

The present invention focuses on that phase of the known process, in which the glass gob is kept in suspension for a certain period by means of a gas stream. During this time the glass balls or gobs can cool off, be heated and/or kept at a certain temperature. The associated device comprises a membrane of an open-pored material as an essential element. The membrane may be discoid. The disc can be even or have the shape of a trough corresponding to the shape of the glass gob.

JP-A-H10-139465 describes such membranes. These have the form of a trough-like circular disc which is clamped by its outer circumference in the carrier. The circular disc is relatively thin-walled and comprises an upper and lower surface. A compressed gas is applied to the lower surface, which migrates through the pores of the membrane and exits again at the upper surface of the membrane. Glass drops from a molten mass are applied intermittently to the membrane. The individual glass drop is suspended for a certain time by the compressed gas exiting from the upper membrane surface, as per procedural requirements.

The known devices are encumbered with disadvantages. A particular disadvantage is that the membrane material exhibits minimal stability only. From this viewpoint considerable wall strength of the membrane is preferable to reduce the risk of breakage.

On the other hand, with a given gas pressure, a specific quantity of gas should penetrate through the membrane from top to bottom to guarantee that the gas cushion required to levitate the glass gob develops. To prevent unnecessarily high supply gas pressures, the membrane must be made thin-walled.

SUMMARY OF THE INVENTION

The object of the invention is to provide a device of the above mentioned type with a membrane such that the membrane performs its functions trouble-free with respect to levitation, but that the breaking strength is boosted at the same time.

A device, according to the invention, for manufacturing glass gobs includes a membrane body of a porous gas transmitting material and having a gas outlet surface, e.g. its upper surface. Channels for introducing compressed gas into the membrane body extend through the membrane body material and are spaced at a distance from the gas outlet surface of the membrane body. The channels run parallel to or are at an acute angle to the outlet surface. In an alternate embodiment, the channels are open channels at the opposite surface from the outlet surface.

Such a membrane can be and preferably should be made substantially more thick-walled than a conventional membrane. A chunk or block is used instead of a thin disc. This is provided with channels, in addition to the 'natural' channels which the material has on account of porosity. The channels are set into the material of the membrane in any manner, for example by means of boring or molding. It is important that at least some of the channels not terminate on the gas outlet surface facing the glass gob, but that they rather run constantly at a certain distance therefrom. At the same time the channels can run parallel to the gas outlet surface, or at a certain angle thereto, or even vertically thereto. If the channels run vertically to the outlet surface of the membrane body, then they again terminate at a certain distance from the outlet surface in accordance with the invention. If such channels are made by boring, then they are pocket bores.

Such a membrane body can be of practically any size. Accordingly, it exhibits a high degree of stability. There should be a certain distance between the gas outlet surface and the channels. The distance can be relatively small, so that the path of the compressed gas is minimal, and that a highly efficient gas cushion, which can also support glass gobs of greater weight, can thus be formed about the gas outlet surface in a highly efficient manner.

Frequently the channels are formed such that they run more or less parallel to the gas outlet surface.

A further advantage of the invention is as follows: A membrane material which has smaller pores than previously can be used due to the increase according to the present invention in stability of the membrane body. Conveniently high gas throughputs can be achieved, again allowing the gas cushion to be built up to be optimized. If membrane bodies were used instead, which are designed according to the prior art, they would have to have minimal thickness and be operated at high pressures. This leads to extreme material stresses and thus to the risk of breakage.

In the case of the design according to the present invention, however, conveniently and without risk of breakage, high gas throughputs can be achieved, with which the gas cushion to be built up can again be optimized.

Again on account of the increased stability, there is relatively free choice of the membrane material. Porous graphite is also considered as membrane material. In the case of small gobs of minimal weight, graphite of moderate quality suffices.

The invention offers yet another advantage:

In the case of known, self-contained membranes there is frequently flattening of the supporting, softened glass gobs on their underside in their central region. This can lead to a convex contour forming. The reason for this is that the levitation gas of the gas cushion exits from the entire membrane surface, but it can leave the interstice between the gas outlet surface of the membrane and the glass gob only at the edge of the membrane. This creates gas congestion under the supporting glass gob in the abovementioned central region, which leads to the desired flattening or denting.

This phenomenon can be counteracted by corresponding dimensioning and configuring of the channels according to the present invention. Outlet channels can be provided which cause the gas stream escaping in the central region to be reduced. In the interests of achieving optimum results, an outlet channel, which leads away from the gas outlet surface, can even be provided in the central region. Such a channel can be provided with control systems, or can even be connected to a subpressure source.

BRIEF DESCRIPTION OF THE DRAWINGS

The invention is explained in greater detail with reference to the drawings, in which.

DESCRIPTION OF PREFERRED EMBODIMENTS

Figure 1:
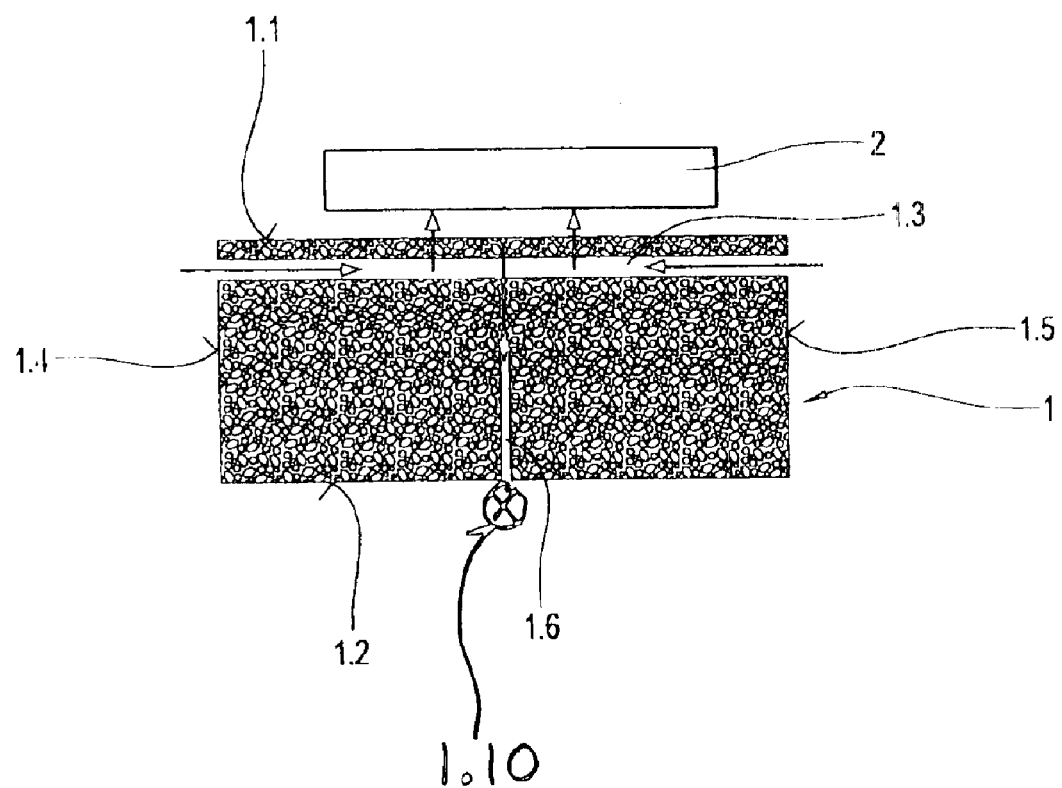
FIG. 1 diagrammatically illustrates a membrane body with a glass ball kept in suspension above the body.

The membrane body 1 illustrated in FIG. 1 helps form an air cushion to support a glass body 2.

The membrane body 1 is considerably thick, as compared to known membrane discs. As is evident, in the present case the thickness is approximately half its length. It would also be possible to make the membrane body somewhat thinner, so that the ratio of thickness to length is approximately 1:4, or to make the thickness even greater than illustrated here, so that the ratio of thickness to length is approximately 1:1.

The membrane body 1 exhibits an upper surface 1.1 and a lower surface 1.2. The upper surface 1.1 is called gas outlet surface hereinbelow.

There is also a channel 1.3 which runs through the membrane body 1. In the present case channel 1.3 runs parallel to the gas outlet surface 1.1. It could also run inclined at a certain angle to the gas outlet surface 1.1. It is important that it runs at a certain distance from the gas outlet surface 1.1. This distance can be minimal. Pressurized gas is conveyed through the channel. The gas is thus introduced into a borehole which is located respectively in a side surface 1.4 or 1.5 of the membrane body 1, or also in the lower surface 1.2, if required.

The membrane body 1 comprises an open-pore material. If pressurized gas is introduced into the channel 1.3, compressed gas penetrates the pores because of the open-pored nature of the material of the membrane, as per the downwards pointing arrow. An air cushion, which keeps the glass body in suspension through corresponding configuring of the operating parameters (pressure and throughput, porosity of the material and the like), forms between the gas outlet surface 1.1 and the glass body 2.

Another channel 1.6 is also evident. This is located in a central region of the membrane body 1, and under a central region of the glass body 2 at the same time. This channel serves as outlet channel. The pressure of the gas cushion in the central region can be more or less sharply decreased. An outlet channel 1.6 may have a control valve 1.10, so that the ratios can be sensitively adjusted and flattening or denting in the glass body 2 is avoided in this central region. The outlet channel 1.6 may be positioned at a location across the membrane body selected for reducing gas pressure above the outlet channel for controlling the manufacture of a glass gob suspended above the membrane body.

It is understood that the glass body 2 does not have the rectangular shape illustrated here. It can also take on the shape of an ellipsoid of revolution, a lens or a sphere.

It is also important that the glass body 2 can be both a solid and a practically liquid body.

Figure 2:
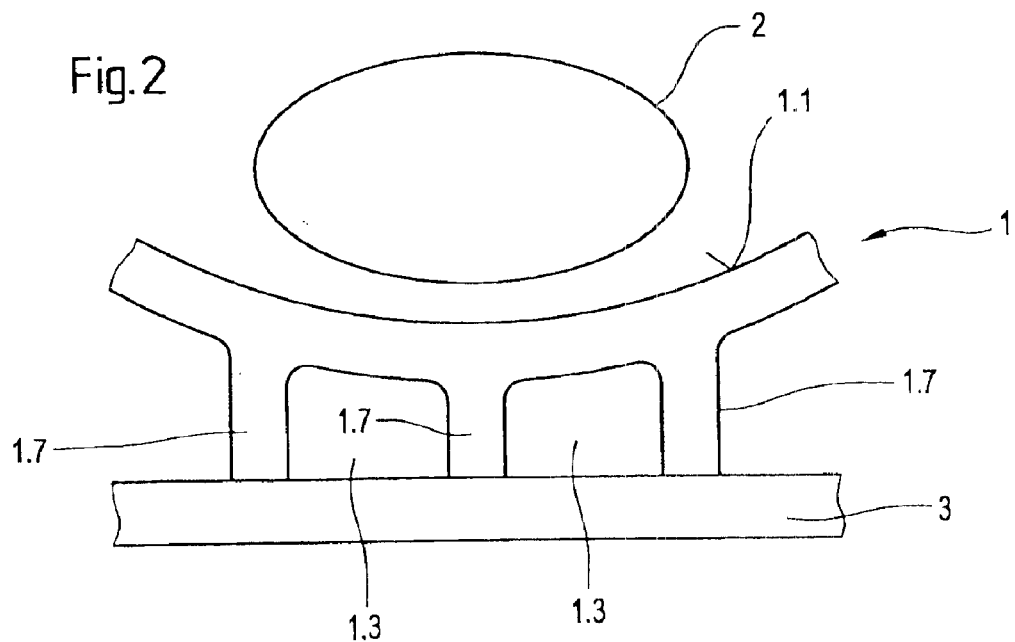
FIG. 2 illustrates an embodiment of a trough-like membrane body in side elevation.

In the embodiment according to FIG. 2 the glass body 2 has the shape of an ellipsoid of revolution. The gas outlet surface 1.1 of the membrane body 1 is accordingly concave in shape. The membrane body 1.1 rests on a base plate 3 and has supports 1.7. These can be shaped as either ribs or columns. In any case there are also channels 1.3 here, limited below by the support body 3. Compressed gas can be introduced into these channels 1.3, which penetrates upwards via the walls of the membrane body 1 towards the gas outlet surface 1.1 where it forms an air cushion above this gas outlet surface. The wall of the membrane body 1 to be penetrated is thin, such that the gas has to travel a short distance only. Nevertheless, the membrane body 1 is a relatively rigid body due to the supports 1.7.

Figure 3:
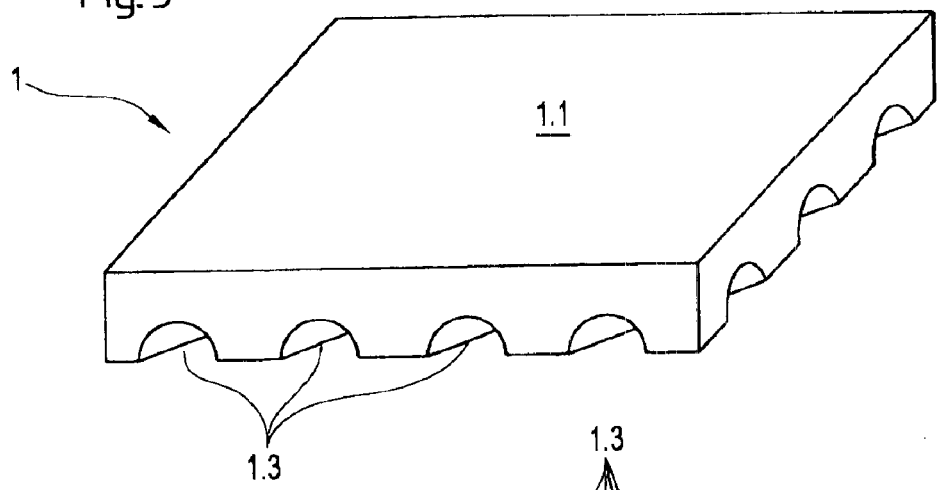
FIG. 3 illustrates a flat membrane body in perspective.
Figure 4:
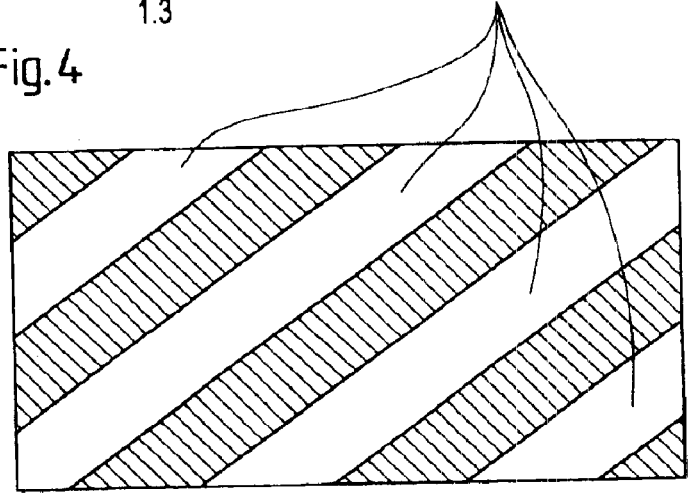
FIG. 4 illustrates the object of FIG. 3 in an external view.

Membrane body 1 according to FIGS. 3 and 4 is a flat disc. The disc has channels 1.3 on its underside. The channels run more or less diagonally through the membrane body 1. The compressed gas is conveyed through the channels 1.3 and here again penetrates through the remaining wall thickness to the gas outlet surface 1.1 The channels are in this case open to the underside—almost exactly as in the embodiment according to FIG. 2.

The invention has proven itself best of all in practice. It was particularly surprising that the channel or column structure results in a completely homogenous effect on the glass surface of the glass body 2. No non-homogeneity has resulted.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for producing glass gobs, comprising:
   a membrane body including a gas outlet surface and an opposite surface, wherein the membrane body includes a porous material for permitting passage of compressed gas through pores of the membrane body to levitate the glass gobs above the gas outlet surface of the membrane body;
   at least one gas channel, formed in the membrane body and larger in cross section than the pores therein and configured to introduce compressed gas into the membrane body and to pass the compressed gas across the membrane body, the gas channel not extending to the gas outlet surface of the membrane body;
   the at least one gas channel is embedded in the porous material of the membrane body and is positioned at a distance from the outlet surface of the membrane body such that the compressed gas introduced through the at least one gas channel may pass through the membrane body and out the outlet surface to levitate the glass gobs above the gas outlet surface of the membrane body.

2. The device of claim 1, wherein the at least one gas channel is either parallel or at an acute angle to the outlet surface passing through the membrane body.

3. The device of claim 1, further comprising an outlet channel in the membrane body passing through the membrane body and exiting a surface of the membrane body and having a cross-section larger than that of the pores of the membrane body for defining an outlet path for the compressed gas in the membrane body.

4. A device for producing glass gobs, comprising:
   a membrane body including a gas outlet surface and an opposite surface, wherein the membrane body includes a porous material for permitting passage of compressed gas through pores of the membrane body;
   at least one channel, formed in the membrane body and larger in cross section than the pores therein for introduction of compressed gas into the membrane body and passage of the compressed gas across the membrane body;
   the at least one channel is embedded in the porous material of the membrane body and is positioned at a distance from the outlet surface of the membrane body such that the compressed gas introduced through the at least one gas channel may pass through the membrane body and out the outlet surface; and valves in the outlet channel for controlling the flow therethrough.

5. A device for producing glass gobs, comprising:

a membrane body including a gas outlet surface and an opposite surface, wherein the membrane body includes a porous material for permitting passage of compressed gas through pores of the membrane body;

at least one channel, formed in the membrane body and larger in cross section than the pores therein for introduction of compressed gas into the membrane body and passage of the compressed gas across the membrane body;

the at least one channel is embedded in the porous material of the membrane body and is positioned at a distance from the outlet surface of the membrane body such that the compressed gas introduced through the at least one gas channel may pass through the membrane body and out the outlet surface, wherein the membrane body is generally a disc having a diameter to thickness ratio in the range 1:1 to 10:1.

6. The device of claim 2, wherein the at least one gas channel passing through the membrane body for compressed gas is located in the membrane body such that the distance between the at least one gas channel and the outlet surface of the membrane body is less than half the thickness of the membrane body.

7. The device of claim 1, wherein the membrane body opposite surface is opposite the outlet surface, and the gas channels for compressed gas passing through the membrane body are open gas channels which open toward the opposite surface of the membrane body.

8. The device of claim 3, wherein the outlet channel is positioned at a location across the membrane body selected for reducing gas pressure above the outlet channel for controlling a manufacture of a glass gob suspended above the membrane body.

9. The device of claim 1, wherein the outlet surface is a horizontal upper surface.

10. A device for producing glass gobs, comprising:

a membrane body including a gas outlet surface and an opposite surface, wherein the membrane body includes a porous material for permitting passage of compressed gas through pores of the membrane body to levitate the glass gobs above the gas outlet surface of the membrane body;

at least one gas channel, formed in the membrane body and larger in cross section than the pores therein and configured to introduce compressed gas into the membrane body and to pass the compressed gas across the membrane body;

the at least one gas channel is embedded in the porous material of the membrane body and is positioned at a distance from the outlet surface of the membrane body such that the compressed gas introduced through the at least one gas channel may pass through the membrane body and out the outlet surface to levitate the glass gobs above the gas outlet surface of the membrane body; and a glass introduction device operable to introduce the glass gobs to the gas outlet surface of the membrane body.

11. The device of claim 10, wherein the at least one gas channel is either parallel or at an acute angle to the outlet surface passing through the membrane body.

12. The device of claim 10, further comprising an outlet channel in the membrane body passing through the membrane body and exiting a surface of the membrane body and having a cross-section larger than that of the pores of the membrane body for defining an outlet path for the compressed gas in the membrane body.

13. The device of claim 11, wherein the at least one gas channel passing through the membrane body for compressed gas is located in the membrane body such that the distance between the at least one gas channel and the outlet surface of the membrane body is less than half the thickness of the membrane body.

14. The device of claim 10, wherein the membrane body opposite surface is opposite the outlet surface, and the gas channels for compressed gas passing through the membrane body are open gas channels which open toward the opposite surface of the membrane body.

15. The device of claim 12, wherein the outlet channel is positioned at a location across the membrane body selected for reducing gas pressure above the outlet channel for controlling a manufacture of a glass gob suspended above the membrane body.

16. The device of claim 10, wherein the outlet surface is a horizontal upper surface.

* * * * *